(12) United States Patent
Sasaki et al.

(10) Patent No.: US 8,472,747 B2
(45) Date of Patent: Jun. 25, 2013

(54) IMAGE COMPOSITION DEVICE, IMAGE COMPOSITION METHOD, AND STORAGE MEDIUM STORING PROGRAM

(75) Inventors: Masaaki Sasaki, Hachioji (JP); Tetsuji Makino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 219 days.

(21) Appl. No.: 12/972,884

(22) Filed: Dec. 20, 2010

(65) Prior Publication Data

US 2011/0158551 A1  Jun. 30, 2011

(30) Foreign Application Priority Data

Dec. 25, 2009  (JP) ................................ 2009-294349

(51) Int. Cl.
*G06K 9/40* (2006.01)
*G06K 9/36* (2006.01)

(52) U.S. Cl.
USPC .......................................... 382/266; 382/284

(58) Field of Classification Search
USPC ................ 382/173, 254, 264, 266, 274–275, 382/284, 305, 312; 358/520, 540; 345/589, 345/611, 617, 620, 629
See application file for complete search history.

(56) References Cited

U.S. PATENT DOCUMENTS

| | | | | |
|---|---|---|---|---|
| 5,870,103 A | * | 2/1999 | Luo | 345/630 |
| 6,384,839 B1 | * | 5/2002 | Paul | 345/613 |
| 6,400,832 B1 | * | 6/2002 | Sevigny | 382/103 |
| 6,483,521 B1 | * | 11/2002 | Takahashi et al. | 345/630 |
| 6,525,741 B1 | * | 2/2003 | Klassen et al. | 345/589 |
| 6,751,347 B2 | * | 6/2004 | Pettigrew et al. | 382/162 |
| 7,269,294 B2 | * | 9/2007 | Curry et al. | 382/257 |
| 7,970,206 B2 | * | 6/2011 | Harris et al. | 382/162 |
| 2009/0290796 A1 | | 11/2009 | Shi et al. | |

FOREIGN PATENT DOCUMENTS

| | | |
|---|---|---|
| JP | 2003-330069 A | 11/2003 |
| JP | 2004-159158 A | 6/2004 |
| JP | 2005-039680 A | 2/2005 |
| JP | 2006-313302 A | 11/2006 |
| JP | 2009-282979 A | 12/2009 |

OTHER PUBLICATIONS

Chinese Office Action dated Nov. 30, 2012 (and English translation thereof) in counterpart Chinese Application No. 201010625216.9
Japanese Office Action dated Sep. 11, 2012 (and English translation thereof) in counterpart Japanese Application No. 2009-294349.

* cited by examiner

*Primary Examiner* — Kanjibhai Patel
(74) *Attorney, Agent, or Firm* — Holtz, Holtz, Goodman & Chick, P.C.

(57) ABSTRACT

An image composition device includes an obtaining section configured to obtain a downward-taken background image and a foreground image to be composed with the background image, a specification section configured to specify a position at which the foreground image is composed, in the background image obtained by the obtaining section, a composition section configured to compose the foreground image at the position in the background image which is specified by the specification section, to generate a composed image, and an image processing section configured to execute a smoothing process with a process intensity controlled based on the position, on the composed image.

8 Claims, 10 Drawing Sheets

IMAGE COMPOSITION DEVICE, IMAGE COMPOSITION METHOD, AND STORAGE MEDIUM STORING PROGRAM

CROSS-REFERENCE TO RELATED APPLICATIONS

This application is based upon and claims the benefit of priority from prior Japanese Patent Application No. 2009-294349, filed Dec. 25, 2009, the entire contents of which are incorporated herein by reference.

BACKGROUND OF THE INVENTION

1. Field of the Invention

The present invention relates to an image composition device, an image composition, and a storage medium storing a program, which compose a plurality of images.

2. Description of the Related Art

Techniques are conventionally known which are designed to generate a composed image by composing a subject image with a background image or a frame image (for example, Jpn. Pat. Appln. KOKAI Publication No. 2004-159158).

However, if a plurality of images are composed to generate an interesting composed image, when an image located in the background of a subject image has excessively strong or weak sense of reality, the resulting composed image involves a sense of discomfort between the subject image and the background image. This may disadvantageously make the composed image uninteresting.

BRIEF SUMMARY OF THE INVENTION

Accordingly, it is an object of the present invention to provide an image composition device, an image composition method, and a storage medium storing a program, capable of properly making a composed image more interesting in accordance with a composition position for the image.

According to one aspect of the present invention, there is provided an image composition device comprising: an obtaining section configured to obtain a downward-taken background image and a foreground image to be composed with the downward-taken background image; a specification section configured to specify a position at which the foreground image is composed, in the background image obtained by the obtaining section; a composition section configured to compose the foreground image at the position in the background image which is specified by the specification section, to generate a composed image; and an image processing section configured to execute a smoothing process with a process intensity controlled based on the position, on the composed image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Specific aspects of the present invention will be described below with reference to the drawings. However, the scope of the present invention is not limited to illustrated examples.

Figure 1:
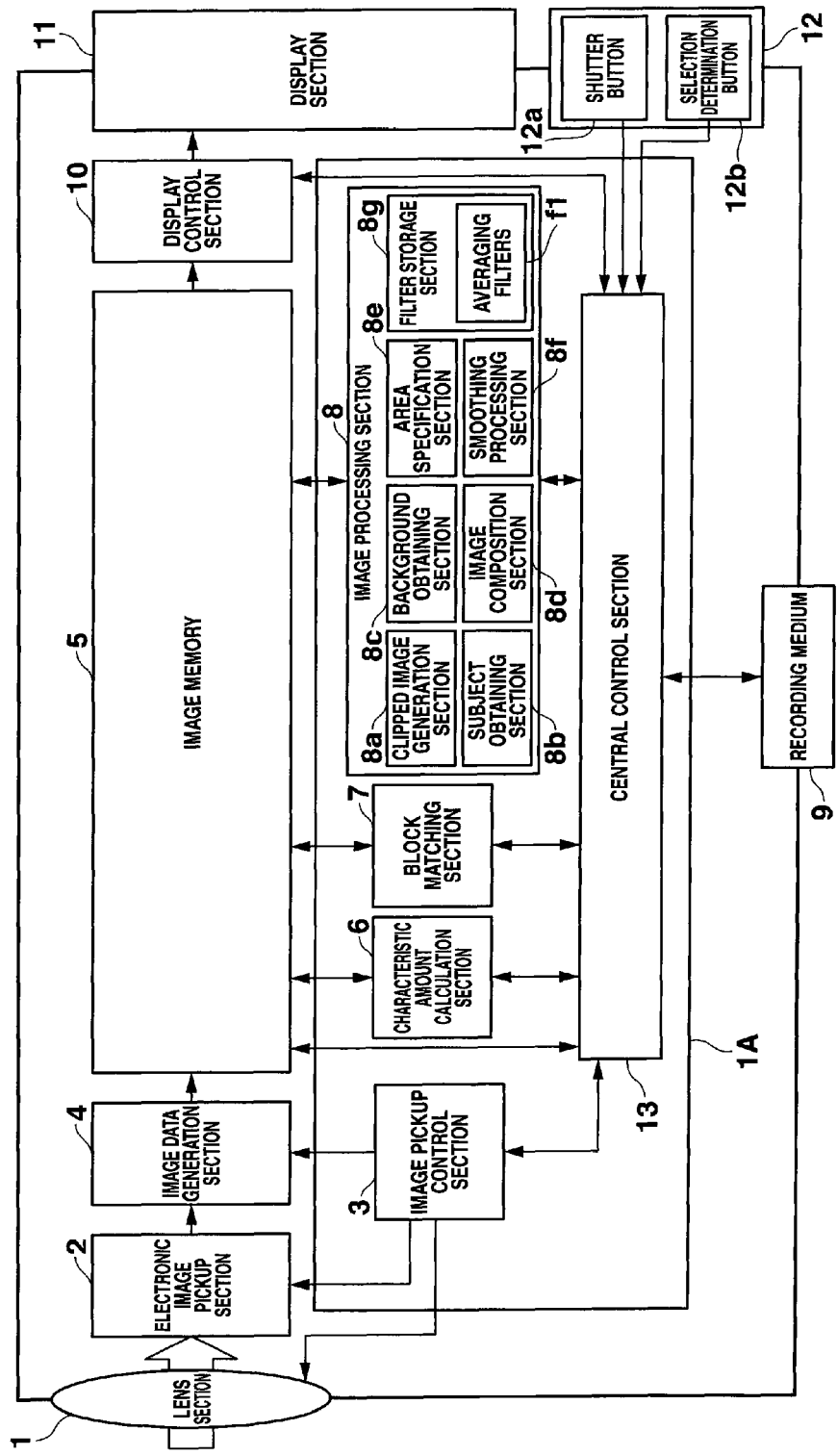
FIG. 1 is a block diagram showing the configuration of an image pickup device according to an embodiment to which the present invention is applied.

FIG. 1 is a block diagram schematically showing the configuration of an image pickup device 100 according to an embodiment to which the present invention is applied.

The image pickup device 100 composes a subject image G (FIG. 5A) at a composition position for the subject image G in a downward-taken background image P4a (FIG. 10A) to generate a subject composed image P5. The image pickup device 100 further executes a smoothing process on the subject composed image P5 based on the composition position for the subject image G.

Specifically, as shown in FIG. 1, the image pickup device 100 includes a lens section 1, an electronic image pickup section 2, an image pickup control section 3, an image data generation section 4, an image memory 5, a characteristic amount calculation section 6, a block matching section 7, an image processing section 8, a recording medium 9, a display control section 10, a display section 11, an operation input section 12, and a central control section 13.

Furthermore, the following are designed as, for example, a custom LSI 11A: the image pickup control section 3, the characteristic amount calculation section 6, the block matching section 7, the image processing section 8, and the central control section 13.

The lens section 1 includes a plurality of lenses including a zoom lens and a focus lens.

Furthermore, the lens section 1 may include a zoom driving section configured to move the zoom lens along an optical axis while an image of a subject S is being taken, a focus driving section configured to move the focus lens along the optical axis while an image of the subject S is being taken; the zoom driving section and the focus driving section are not shown in the drawings.

The electronic image pickup section 2 includes an image sensor, for example, a charge coupled device (CCD) or complementary metal-oxide semiconductor (CMOS), to transform an optical image having passed through the various lenses of the lens section 1 into a two-dimensional image signal.

The image pickup control section 3 includes a timing generator and a driver which are not shown in the drawings. The image pickup control section 3 allows the timing generator and the driver to drive the electronic image pickup section 2 for scanning. Thus, the image pickup control section 3 allows the electronic image pickup section 2 to perform a transformation into a two-dimensional image at every predetermined period. The electronic image pickup section 2 then reads an image frame for one screen from an image pickup area of the electronic image pickup section 2 and outputs the image frame to the image data generation section 4.

Furthermore, the image pickup control section 3 performs adjustable control of image pickup conditions for the subject S such as an automatic focusing (AF) process, automatic exposure (AE) process, and automatic white balance (AWB) process.

The image data generation section 4 properly executes gain adjustment for each of RGB color components in an analog value signal for the image frame transferred by the electronic image pickup section 2. The image data generation section 4 then allows a sample hold circuit (not shown in the drawings) to sample and hold the adjusted signal and allows an analog-to-digital converter (not shown in the drawings) to digitize the signal. The image data generation section 4 further allows a color process circuit (not shown in the drawings) to execute color processing including a pixel interpolation process and a gamma correction process and then to generate a luminance signal Y and color difference signals Cb and Cy (YUV data) all having a digital value.

The luminance signal Y and color difference signals Cb and Cy output by the color process circuit are DMA-transferred to the image memory 5 used as a buffer memory.

The image memory 5 includes, for example, DRAM, and temporarily stores data processed by the characteristic amount calculation section 6, the block matching section 7, the image processing section 8, the central control section 13, and the like.

Based on a subject non-present image P2, the characteristic amount calculation section 6 executes a characteristic extraction process of extracting characteristic points from the subject non-present image P2. Specifically, based on, for example, the YUV data on the subject non-present image P2, the characteristic amount calculation section 6 selects a predetermined number of (or at least a predetermined number of) highly characteristic block areas (characteristic points). The characteristic amount calculation section 6 extracts the contents of the blocks as a template (for example, a 16×16-pixel square).

Here, the characteristic extraction process selects any of a large number of candidate blocks which is highly characteristic and convenient for tracking.

The block matching section 7 executes a block matching process for positioning of the subject non-present image P2 and a subject present image P1 when a subject clipped image P3 is to be generated. Specifically, the block matching section 7 determines to which position in the subject present image P1 the template extracted by the characteristic extraction process corresponds, that is, searches for a position (corresponding area) in the subject present image P1 which is matched by a pixel value in the template. The block matching section 7 calculates the optimum offset between the subject non-present image P2 and subject present image P1 which exhibit the best evaluation value for the level of the difference in pixel value (for example, the square sum of differences or the best sum of absolute differences [SAD]) to be the motion vector of the template.

The image processing section 8 includes a clipped image generation section 8a, a subject obtaining section 8b, a background obtaining section 8c, an image composition section 8d, an area specification section 8e, a smoothing processing section 8f, and a filter storage section 8g.

The clipped image generation section 8a generates image data on the subject clipped image P3. Specifically, the clipped image generation section 8a includes an alignment section, a subject image extraction section, a position information generation section, and an image generation section (not shown).

The alignment section calculates a coordinate transformation equation (projective transformation matrix) for each pixel in the subject present image P1 with respect to the subject non-present image P2 based on the characteristic points extracted from the subject non-present image P2. Then, in accordance with the coordinate transformation equation, the alignment section performs a coordinate transformation on the subject present image P1 and aligns the subject present image P1 with the subject non-present image P2.

The subject image extraction section generates information on the difference between each pixel in the subject present image P1 and the corresponding pixel in the subject non-present image P2; the subject present image P1 and the subject non-present image P2 have been aligned with each other by the alignment section. Then, based on the difference information, the subject image extraction section extracts a subject image (foreground image) G containing the subject from the subject present image P1.

The position information generation section identifies the position of the subject image G extracted from the subject present image P1 to generate position information (for example, an alpha map) indicative of the position of the subject image G in the subject present image P1. Here, the alpha map refers to alpha values ($0 \leq \alpha \leq 1$) each indicative of a weight for each pixel in the subject present image P1 which is used to alpha-blend the subject image G into the predetermined background.

Based on the alpha map, the image generation section generates image data on the subject clipped image P3 as follows. That is, the image generation section composes the subject image and a predetermined single-color image so as to prevent the single-color image (not shown in the drawings) from being transmitted through the pixels in the subject present image P1 which have an alpha value of 1, while allowing the single-color image to pass through the pixels having an alpha value of 0.

The subject obtaining section 8b obtains image data on the subject clipped image P3 recorded in the recording medium 9.

That is, in the composed image generation process, by means of reading from the recording medium 9, the subject obtaining section 8b obtains the subject image (foreground image) G from any of at least one subject clipped image P3 recorded in the recording medium 9 which is specified by a user's predetermined operation of the operation input section 12.

Here, the subject obtaining section 8b forms foreground obtaining section that obtains the subject image G serving as a foreground image.

The background obtaining section 8c obtains the image data on the background image P4a recorded in the recording medium 9.

That is, in the composed image generation section, by means of reading from the recording medium 9, the background obtaining section 8c obtains the image data on any of at least one background image P4a recorded in the recording medium 9 which is specified by a user's predetermined operation of the operation input section 12.

The background image P4a is a downward-taken image which is taken in a direction of looking down from above, and includes, for example, a downward-taken image taken in a direction of looking down on a wide range from a higher position.

Here, the background obtaining section 8c forms background obtaining means to obtain the background image P4a instead of the subject image G serving as a foreground image.

Furthermore, the image composition section 8d serves as composition means to compose the background image P4a and the subject image G of the subject clipped image P3 to generate a subject composed image P5.

Figure 2A:
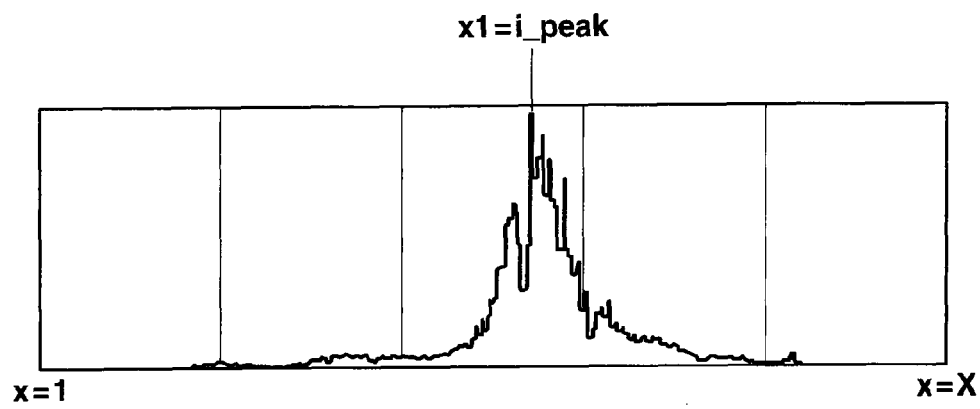
FIGS. 2A and 2B are diagrams illustrating an example of a histogram of a subject image related to a composed image generation process executed by the image pickup device in FIG. 1.
Figure 2B:
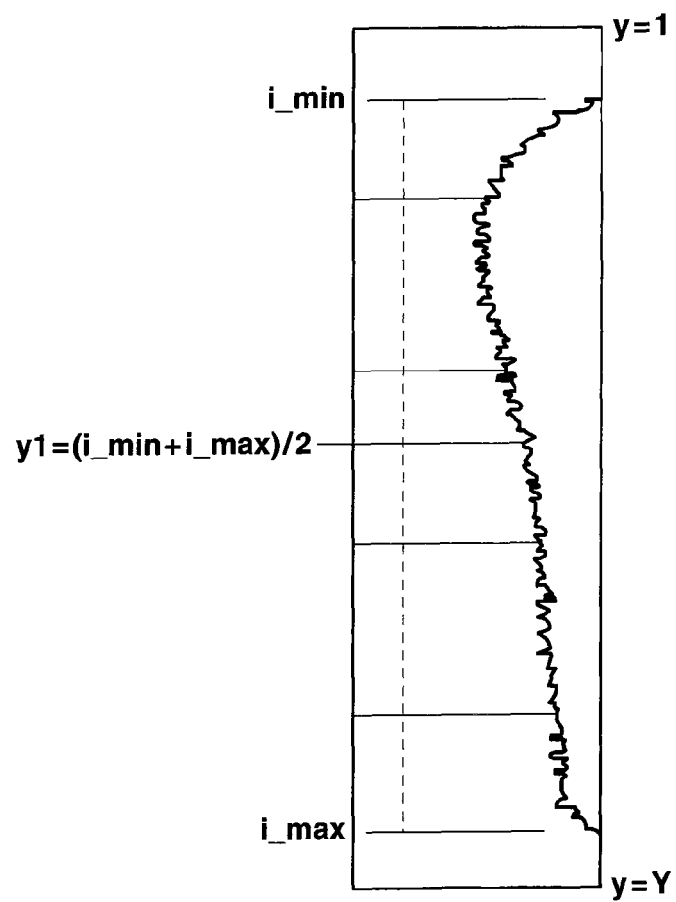

That is, the image composition section 8 generates the subject composed image P5 by composing the subject image G at a composition position for the subject image G in the background image P4a which is specified by the central control section 13 based on the user's predetermined operation of the operation input section 12. Specifically, the image composition section 8d first calculates the coordinates of an approximate center of the subject image G in the subject clipped image P3 obtained by the subject obtaining section 8b, to be center coordinates C1 ($x1, y1$). For example, as shown in FIG. 2A and FIG. 2B, the image composition section 8d calculates the center coordinates C1 ($x1, y1$) of the subject image G using histograms for the horizontal (x-) and vertical (y-) axes of the subject image G.

Here, on the assumption that the size of the subject image is equal to x pixels on the x-axis and to y pixels on the y-axis, a method for calculating the center coordinates C1 ($x1, y1$) of the subject image G will be described. The composition size of the subject image G can be changed based on the user's predetermined operation of the operation input section 12.

The pixel value for the pixel P in the subject image G is defined as $P(x, y)$. Then, the image composition section 8d calculates the sum of histogram values for an x-axial position $x=0$, i.e., $Hx(0)=P(0, 0)+P(0, 1)+P(0, 2)+P(0, 3)+P(0, 4)+ \ldots +P(0, y)$. Similarly, the image composition section 8d calculates the sum of histogram values for all the x-axial positions $x=0$. Then, if there is a peak with at least a predetermined value in the distribution of sums of the histogram values, the image composition section 8d sets the position of the peak to be the x-coordinate of the center coordinates (FIG. 2A). On the other hand, if there is no peak with at least a predetermined value in the distribution of sums of the histogram values, the image composition section 8d sets a position corresponding to the center (or middle) between the maximum value Max and minimum value Min of the distribution to be the x-coordinate of the center coordinates.

Also for the y-axis, the image composition section 8d calculates the sum of histogram values for all the y-axial positions. Then, if there is a peak with at least a predetermined value in the distribution of sums of the histogram values, the image composition section 8d sets the position of the peak to be the y-coordinate of the center coordinates. On the other hand, if there is no peak with at least a predetermined value in the distribution of sums of the histogram values, the image composition section 8d sets a position corresponding to the center (or middle) between the maximum value Max and minimum value Min of the distribution to be the y-coordinate of the center coordinates (FIG. 2B).

As described above, the image composition section 8d calculates the center coordinates C1 ($x1, y1$) of the subject image G.

Thereafter, the image composition section 8d calculates coordinates C2 ($x2, y2$) obtained by transforming the center coordinates C1 ($x1, y1$) of the subject image G into a coordinate system for the background image P4a, based on the composition position for the subject image G in the background image P4a specified by the central control section 13 based on the user's predetermined operation of the operation input section 12. For example, if coordinates ($a, b$) in the background image P4a are specified as a composition position for the subject image G, the image composition section 8d transforms the center coordinates C1 ($x1, y1$) into coordinates C2 ($a, b$).

Then, for the pixels in the background P4a obtained by the background obtaining section 8c, the image composition section 8d allows transmission through each pixel with an alpha value of 0, while overwriting each pixel with an alpha value of 1 with the pixel value of the corresponding pixel in the subject clipped image P3. Moreover, for those of the pixels in the background image P4a which have an alpha value of $0<\alpha<1$, the image composition section 8d uses a one's complement ($1-\alpha$) to clip the subject image G to generate an image (background×($1-\alpha$)). The image composition section 8d then calculates a value blended with the single background color when the subject clipped image P3 is generated using the one's complement ($1-\alpha$) in the alpha map. The image composition section 8d then subtracts the value from the subject clipped image P3 and composes the resultant subject clipped image P3 with the image (background image×($1-\alpha$)) obtained by clipping the subject image P5.

The area specification section 8e serves as area specification means to specify a predetermined range substantially centered on the subject image G in the subject composed image P5.

That is, the area specification section 8e specifies an area in the subject composed image P5 formed by the subject image G by transforming all the pixels in the image data on the subject image G into a coordinate system for the subject composed image P5 based on the coordinates C2 ($a, b$) corresponding to the center coordinates C1 ($x1, y1$) transformed into the coordinate system for the background image P4a. The area specification section 8e may determine the area in the subject composed image P5 formed by the subject image G by transforming all the pixels in the image data on the subject image G into the coordinate system for the subject composed image P5 based on the coordinates C2 ($a, b$).

Then, the area specification section 8e specifies an area in the subject composed image P5 which lies within a predetermined range substantially centered on the subject image G.

Here, the predetermined range refers to, for example, an area (FIG. 10B) including all the pixels arranged in the background image P4a on the x-axis (the entire range on the x-axis) and a predetermined number R of pixels arranged around the subject image G on the y-axis, so as to generate a subject composed image P5 smoothed only at the opposite ends of the image on the y-axis, or only an area (FIG. 10C) completely overlapping the subject image 8e.

The area specification section 8e may specify the area of the subject image G in the subject composed image P5 using position information (for example, the alpha map) indicative of the position of the subject image G in the subject present image P1 generated by the position information generation section of the clipped image generation section 8a.

The smoothing processing section 8f executes a smoothing process on the subject composed image P5 based on the composition position of the subject image G.

That is, the smoothing processing section 8f executes a smoothing process on a background image portion P4b of the subject composed image P5 with the process intensity of the smoothing process varied in accordance with a distance D from the coordinates C2 (x2, y2) obtained by transforming the center coordinates C1 (x1, y1) of the subject image G into the coordinate system for the background image P4a.

Specifically, the smoothing processing section 8f avoids executing the smoothing process on the area in the subject composed image P5 which lies within the predetermined range substantially centered on the subject image G.

Furthermore, for the area in the subject composed image P5 which lies out of the predetermined range, the smoothing processing section 8f executes a smoothing process such that the process intensity of the smoothing process increases consistently with the distance from a substantially central portion (coordinates C2 (x2, y2)) of the subject image G in the subject composed image P5.

Figure 10A:
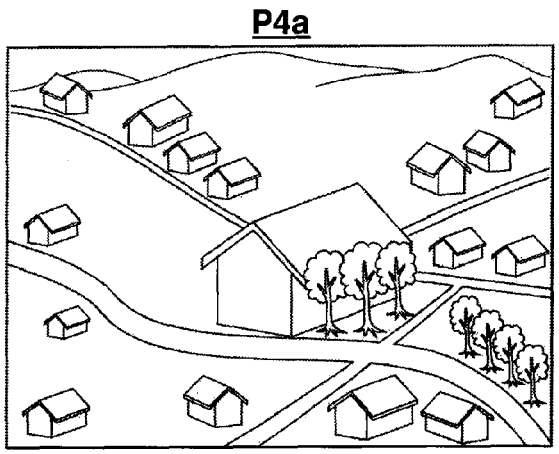
FIGS. 10A, 10B, and 10C are diagrams schematically showing an example of an image related to the composed image generation process.

That is, the smoothing processing section 8f calculates the distance D from the coordinates C2 (x2, y2) for each pixel in the subject composed image P5. The smoothing processing section 8f then specifies one (for example, an averaging filter with 3×3 pixels) of a plurality of averaging filters f1 (FIG. 3A) stored in the filter storage section 8g of the image processing section 8, in accordance with the distance D. Specifically, the smoothing processing section 8f specifies one of the plurality of averaging filters f1 (FIG. 3A) which has a high process intensity such that a smoothing process with a higher process intensity is executed on pixels located further from the coordinates C2 (x2, y2). The smoothing processing section 8f uses the averaging filter f1 specified for each of the pixels in the subject composed image P5 to execute the smoothing process on the background image portion P4b. The smoothing processing section 8f thus smoothes a variation in the grayscale of the background image portion P4b to makes the sense of reality more unclear (FIG. 10C).

Figure 10B:
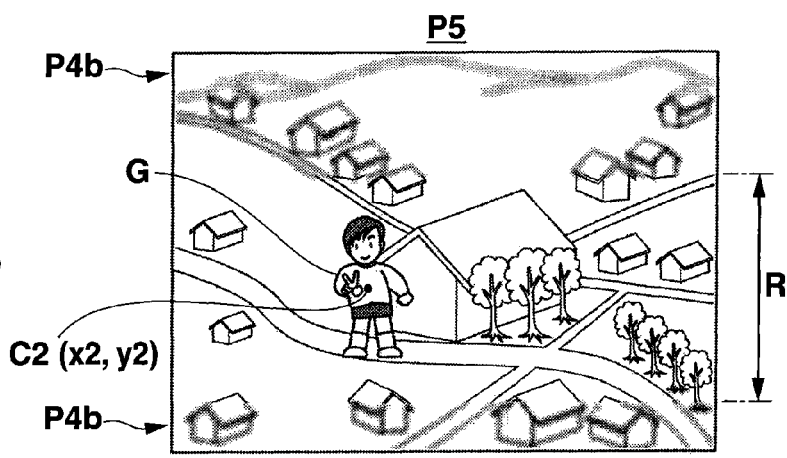
Figure 10C:
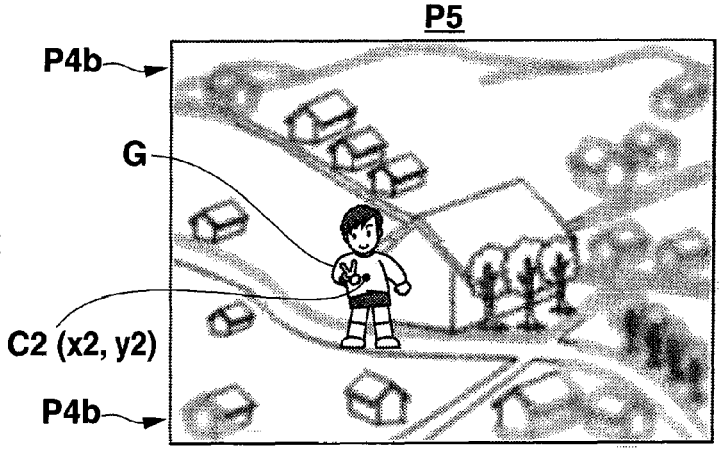

Alternatively, in this case, for positions located further from the subject image G in the subject composed image P5, the smoothing processing section 8f may increase the process intensity of the smoothing process in a direction substantially parallel to at least one of the x-axis (predetermined one axis) and the y-axis (orthogonal axis) substantially orthogonal to the x-axis (FIG. 10B). For example, in FIG. 10B, the smoothing processing section 8f increases the process intensity of the smoothing process in a direction substantially parallel to the y-axis. However, the composition position for the subject image G is closer to one end (lower end) of the image on the y-axis. Thus, the process intensity of the smoothing process increases stepwise only at the other end (upper end) on the y-axis.

In the smoothing process executed by the smoothing processing section 8f using the averaging filter f1, if a pixel located at a predetermined position in the background image portion P4b is filtered, the smoothing processing section 8f replaces the pixel with the average of nearby points around the pixel. For example, if the averaging filter f1 used has 3×3 pixels, the smoothing processing section 8f calculates the average of colors of pixels corresponding to eight areas around a central portion (for example, an area enclosed by a circle in FIG. 3B). The smoothing processing section 8f then determines the calculated average color to be the color of the pixel corresponding to the central portion.

Figure 3A:
FIGS. 3A and 3B are diagrams illustrating an example of an averaging filter related to the composed image generation process executed by the image pickup device in FIG. 1.
Figure 3B:

The smoothing processing section 8f then changes the size of the averaging filter f1 in accordance with the distance D from the coordinates C2 (x2, y2) of the subject image (FIG. 3A). The smoothing processing section 8f thus changes the range of averaging (the number of nearby points to be averaged) to adjust the magnitude of blurring in the background image portion P4b. Specifically, at a greater distance D, a larger averaging filter f1 is used to more severely blur the background image portion P4b. On the other hand, at a smaller distance D, a smaller averaging filter f1 is used to more faintly blur the background image portion P4b.

In this manner, the smoothing processing section 8f forms image processing means for executing the smoothing process on the background image P4a based on the composition position for the subject image G in the background image P4a specified by the central control section (specification means) 13.

The filter storage section 8g is configured to store the distance D from the coordinates C2 (x2, y2) of the subject image G and averaging filters f1 with predetermined sizes, in association with each other (FIG. 2).

Specifically, for example, the "3×3-pixel averaging filter f1" is associated with the distance D from the coordinates C2 (x2, y2) which is "greater than a distance ka to the boundary of the smallest included circle of the subject image G and less than or equal to a predetermined value k1". Furthermore, a "5×5-pixel averaging filter f1" is associated with the distance D that is "greater than k1 and less than or equal to value k2". Additionally, a "7×7-pixel averaging filter f1" is associated with the distance D that is "greater than k2 and less than or equal to value k3". In addition, the "9×9-pixel averaging filter f1" is associated with the distance D that is "greater than k3".

The smallest included circle is one of the circles including a major contour or a material image which has the smallest radius. Furthermore, the distance ka may be a distance to the contour of the subject area instead of the smallest included circle. Moreover, the distance D is calculated based on the numbers of the pixels arranged in the subject composed image P5 on the x- and y-axes. However, this aspect is only illustrative and the present invention is not limited to the aspect. The distance D can be appropriately optionally changed.

The recoding medium 9 includes, for example, a nonvolatile memory (flash memory). The recording medium 9 stores image data on the subject clipped image P3, background image P4a, and subject composed image P5 coded by a JPEG compression section (not shown in the drawings) of the image processing section 8.

That is, the recording medium 9 stores the alpha map generated by the clipped image generation section 8a and the image data on the subject clipped image P3 which have been compressed and associated with each other, with the image data on the subject clipped image P3 provided with the extension ".jpe".

Moreover, the recording medium 9 stores the alpha map generated by the clipped image generation section 8a and the image data on the subject composed image P5 generated by the image composition section 8d, the alpha map and image data having been compressed and associated with each other, with the image data on the subject composed image P5 provided with the extension ".jpg".

The display control section 10 controllably read the display image data temporarily stored in the image memory 5 and allows the displays section 11 to display the data.

Specifically, the display control section 10 includes VRAM, a VRAM controller, and a digital video controller. The digital video controller periodically reads the luminance signal Y and color difference signals Cb and Cr read from the image memory 5 and then stored in VRAM (not shown in the drawings) under the control of the central control section 13. The digital video encoder then generates a video signal based on the data and outputs the signal to the display section 11.

The display section 11 is, for example, a liquid crystal display device and shows a live view image, a REC view image, and the like on the display screen 11a based on the video signal from the display control section 10.

That is, the display control section 10 allows a live view image, a REC view image as the taken image, and the like to be shown on the display screen 11a of the display section 11 based on a plurality of image frames generated through the image taking of the subject S by the lens section 1, the electronic image pickup section 2 and the image pickup control section 3.

The operation input section 12 allows predetermined operations of the image pickup device 100 to be performed. Specifically, the operation input section 12 includes a shutter button 12a for giving an instruction to take an image of the subject, a selection determination button 12b for giving an instruction to select an image taking mode, a function, and the like, and a zoom button (not shown in the drawings) for giving an instruction to adjust a zoom amount. In response to an operation of any of these buttons, the operation input section 12 outputs a predetermined operation signal to the central control section 13.

Furthermore, the selection determination button 12b on the operation input section 12 outputs an instruction to specify a composition position for the subject image G in the subject clipped image P3 in the background image P4a, to the central control section 13. For example, the selection determination button 12b outputs an instruction to specify a composition position of the center coordinate C1 (x1, y1) of the subject image G in the background image P4a, to the central control section 13.

Based on the input specification instruction, the central control section 13 specifies a composition position for the subject image G in the subject clipped image P3 in the background image P4a.

Here, the operation input section 12 and the central control section 13 form specification means for specifying a composition position for the subject image (foreground image) G in the background image P4a.

The central control section 13 controls the sections of the image pickup device 100. Specifically, the central control section 13 includes CPU, RAM, ROM (none of which are shown in the drawings) to perform various control operations in accordance with various programs (not shown in the drawings) for the image pickup device 100.

Now, a subject clipping process executed by the image pickup device 100 will be described with reference to FIG. 4 to FIG. 5C.

Figure 4:
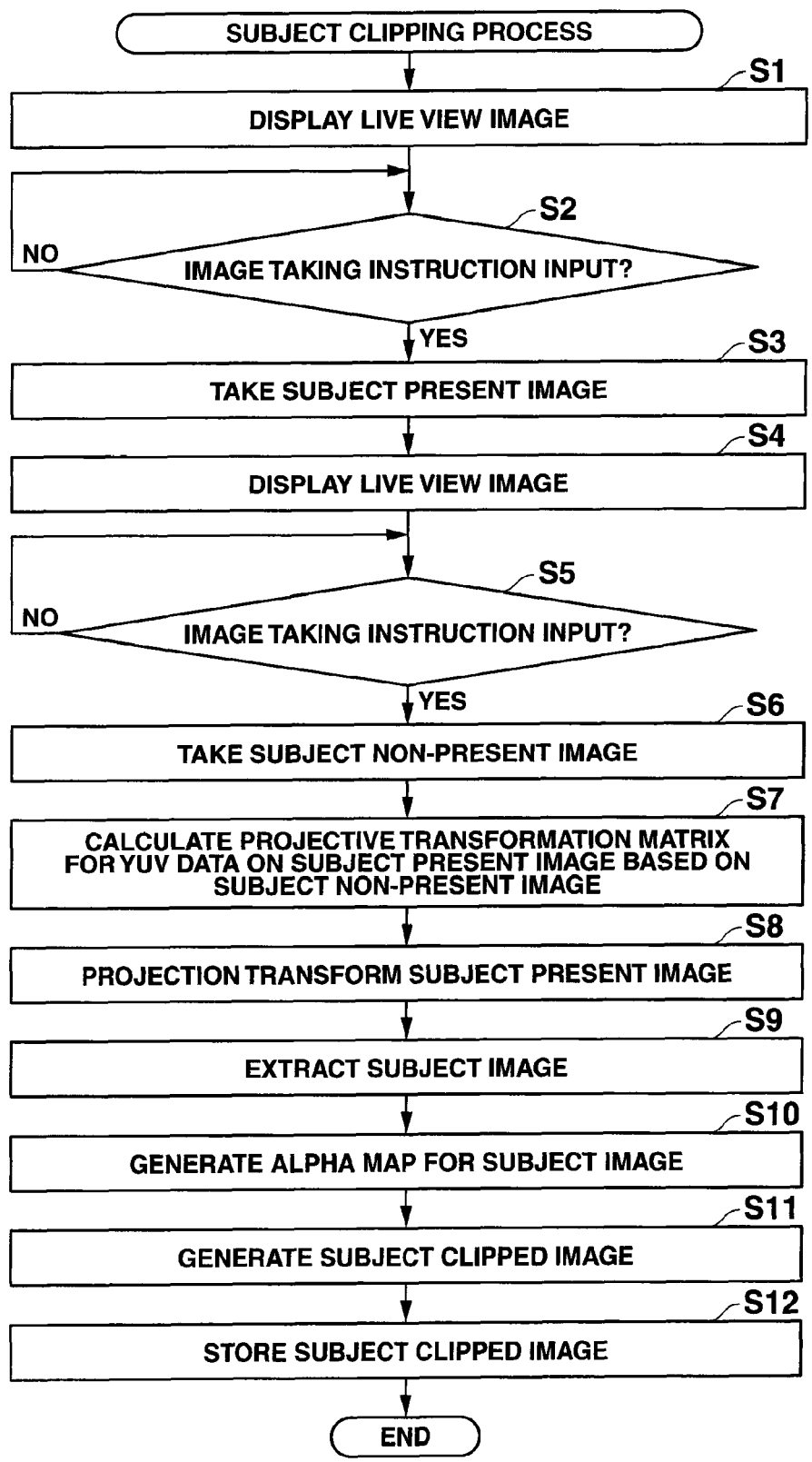
FIG. 4 is a flowchart showing an example of an operation related to a subject clipping process executed by the image pickup device in FIG. 1.
Figure 5A:
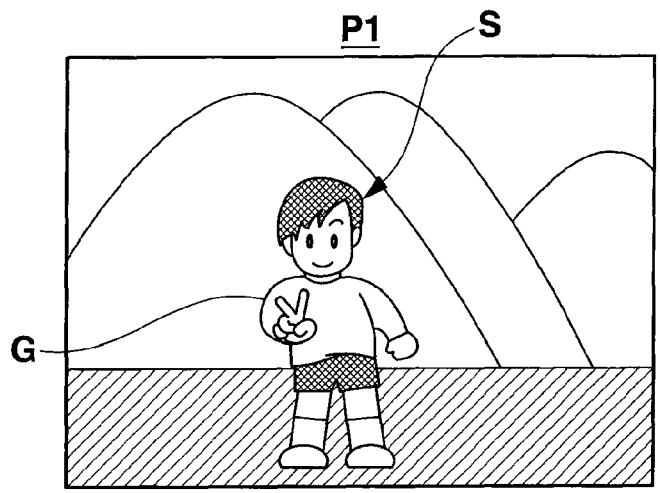
FIGS. 5A, 5B, and 5C are diagrams schematically showing an example of an image related to the subject clipping process.
Figure 5B:
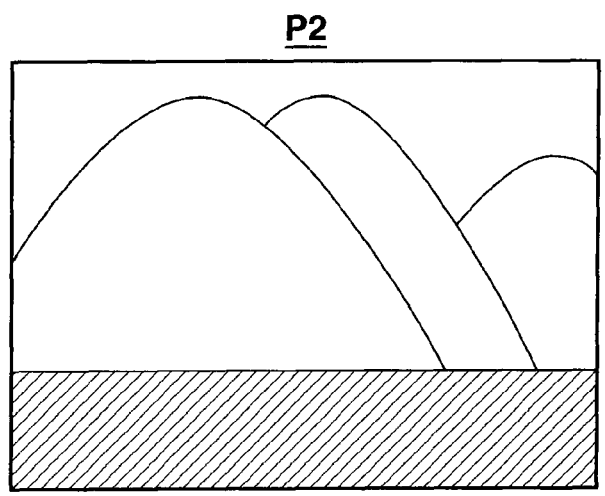
Figure 5C:
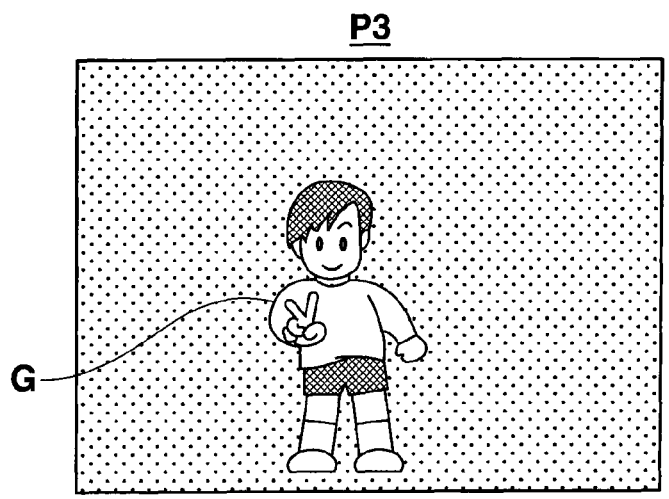

FIG. 4 is a flowchart showing an example of an operation according to the subject clipping process. Furthermore, FIG. 5A to FIG. 5C are diagrams schematically showing an example of an image related to the subject clipping process.

The subject clipping process is executed if a subject clipping mode included in a plurality of image taking mode displayed on a menu screen is selected and specified based on the user's predetermined operation of the selection determination button 12b on the operation input section 12.

As shown in FIG. 4, first, the display control section 10 allows a live view image to be shown on the display screen of the display section 11 based on a plurality of image frames generated through the image taking of the subject S by the lens section 1, the electronic image pickup section 2, and the image pickup control section 3. The display control section 10 further allows the an image taking instruction message for the subject present image P1 to be superimposed on the live view image on the display screen of the display section 11 (step S1).

Then, the central control section 13 determines whether or not an image taking instruction has been input based on the user's predetermined operation of the shutter button 12a on the operation input section 12 (step S2). Here, upon determining that the image taking instruction has been input (YES in step S2), the image pickup control section 3 allows adjustment of conditions such as the focusing position of the focus lens, exposure conditions (shutter speed, aperture value, and amplification factor), and white balance. The image pickup control section 3 thus allows the electronic image pickup section 2 to take an optical subject present image P1 under predetermined conditions (FIG. 5A) (step S3).

Then, the image data generation section 4 generates YUV data on the subject present image P1 transferred by the electronic image pickup section 2. The image data generation section 4 then temporarily stores the YUV data on the subject present image P1 in the image memory 5.

Furthermore, the image pickup control section 3 keeps the conditions such as the focusing position, exposure conditions, and white balance fixed while the subject present image P1 is being taken.

Then, the display control section 10 allows a live view image to be shown on the display screen of the display section 11 based on a plurality of image frames generated through the image taking of the subject S by the lens section 1, the electronic image pickup section 2, and the image pickup control section 3. The display control section 10 further allows an image of the subject present image P1 in a semi-transmissive display form and an image taking instruction message for the subject present image P1 to be superimposed on the live view image on the display screen of the display section 11 (step S4).

Thereafter, the central control section 13 determines whether or not an image taking instruction has been input based on the user's predetermined operation of the shutter button 12a on the operation input section 12 (step S5). Then, the user waits for the subject to move or has the subject move out of the angle of view. Thereafter, the image pickup control section determines that the user has adjusted the camera position so that the subject non-present image P2 is superimposed on the semi-transmissive subject present image P1, and performed the predetermined operation of the shutter button 12a on the operation input section 12 (YES in step S5). The image pickup section 3 then allows the electronic image pickup section 2 to take an optical subject non-present image P2 (FIG. 5B) under the fixed conditions after taking the subject present image P1 (step S6).

Then, the image data generation section 4 generates YUV data on the subject present image P1 transferred by the electronic image pickup section 2. The image data generation section 4 then temporarily stores the YUV data on the subject present image P1 in the image memory 5.

Then, the central control section 13 allows the characteristic amount calculation section 6, the block matching section 7, and the image processing section 8 to calculate a projective transformation matrix used to projection transform the YUV data on the subject present image P1 based on the YUV data on the subject non-present image P2 temporarily stored in the image memory 5, using an image transformation model (for example, a similarity transformation model or a congruence transformation model) (step S7).

Specifically, based on the YUV data on the subject non-present image P2, the characteristic amount calculation section 6 selects a block area (characteristic point) for a predetermined number (or at least a predetermined number) of characteristics are advanced. The characteristic amount calculation section 6 then extracts the contents of the block as a template. Then, the block matching section 7 searches the subject present image P1 for a position optimally matched by the pixel values in the template extracted by the characteristic extraction process. The block matching section 7 thus calculates the optimum offset between the subject non-present image P2 and subject present image P1 which exhibit the best evaluation value for the difference in pixel value to be the motion vector of the template. Then, the alignment section of the clipped image generation section 8a statistically calculate a general motion vector based on the motion vectors of a plurality of templates calculated by the block matching section 7. The alignment section then calculates a projective transformation matrix for the subject present image P1 using a characteristic point correspondence related to the general motion vector.

Then, the alignment section of the clipped image generation section 8a executes a process of projection transforming the subject present image P1 based on the calculated projective transformation matrix to align the YUV data on the subject present image P1 with the YUV data on the subject non-present image P2 (step S8).

The subject image extraction section of the clipped image generation section 8a executes a process of extracting the subject image G containing the subject from the subject present image P1 (step S9).

Specifically, the subject area extraction section applies a low pass filter to each of the YUV data on the subject present image P1 and the YUV data on the subject non-present image P2 to remove high frequency components from each image. Thereafter, the subject area extraction section calculates the level of the difference between each pixel in the subject present image P1 and the corresponding pixel in the subject non-present image P2 to generate a difference level map. Subsequently, the subject area extraction section uses a predetermined threshold to binarize a difference level map related to the pixels. The subject area extraction section then executes a contraction process for removing areas with a difference resulting from subtle noise or hand jiggling, from the difference level map. Thereafter, the subject area extraction section executes a labeling process to remove areas other than those having a value less than or equal to a predetermined value and having the maximum value. The subject area extraction section then determines a pattern of the largest stripes to be the subject image G. The subject area extraction section further executes an expansion process to modify the contraction.

Then, the position information generation section of the image processing section 8 generates an alpha map showing the position of the extracted subject image G in the subject present image P1 (step S10).

Thereafter, the image generation section of the image processing section 8 executes a process of generating image data on the subject clipped image P3 (FIG. 5C) obtained by composing the subject image G with a predetermined single color image (step S11).

Specifically, the image generation section reads and expands the subject present image P1, the single color image, and the alpha map into the image memory 5. The image generation section processes all the pixels in the subject present image P1 as follows. For the pixels having an alpha value of 0, the image generation section allows transmission through each pixel with the alpha value of 0 ($\alpha$=0). For the pixels having an alpha value of 0<$\alpha$<1, the image generation section blends each pixel with the alpha value of 0<$\alpha$<1 with a predetermined single color. For the pixels having an alpha value of 1, the image generation section does nothing on each pixel with the alpha value of 1 and prevents the predetermined single color from passing through the pixel.

Thereafter, the central control section 13 stores the alpha map generated by the position information generation section of the image processing section 8 and the image data on the subject clipped image P3 in a predetermined area of the recording medium 9 in association with each other in a single file (step S12).

Thus, the subject clipping process is finished.

Now, a background image taking process executed by the image pickup device 100 will be described with reference to FIG. 6.

Figure 6:
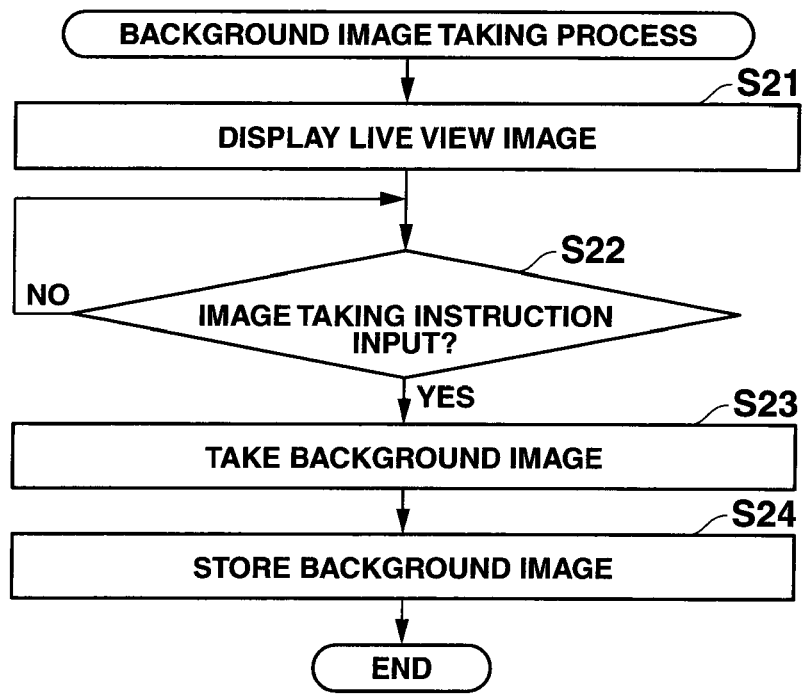
FIG. 6 is a flowchart showing an example of an operation related to a background image taking process executed by the image pickup device in FIG. 1.

FIG. 6 is a flowchart showing an example of an operation related to the background image taking process.

The background image taking process is for normal still images and is executed when a still image taking mode included in the plurality of image taking modes displayed on the menu screen is selected and specified based on the user's predetermined operation of the selection determination button 12b on the operation input section 12.

As shown in FIG. 6, first, the display control section 10 allows a live view image to be shown on the display screen of the display section 11 based on a plurality of image frames generated through the image taking of the subject S by the lens section 1, the electronic image pickup section 2, and the image pickup control section 3 (step S21).

Then, the central control section 13 determines whether or not an image taking instruction has been input based on the user's predetermined operation of the shutter button 12a on the operation input section 12 (step S22). Here, upon determining that the image taking instruction has been input (YES in step S22), the image pickup control section 3 allows adjustment of conditions such as the focusing position of the focus lens, exposure conditions (shutter speed, aperture value, and amplification factor), and white balance. The image pickup control section 3 thus allows the electronic image pickup section 2 to take an optical background image P4a (FIG. 10A) under predetermined conditions (step S23).

Then, the image data generation section 4 generates YUV data on the background image P4a transferred by the electronic image pickup section 2.

The central control section 13 then temporarily stores the YUV data on the background image P4a in a predetermined storage area in the recording medium 9 (step S24).

Thus, the background image taking process is finished.

Now, a composed image generation process executed by the image pickup device 100 will be described with reference to FIG. 7 to FIG. 10C.

Figure 7:
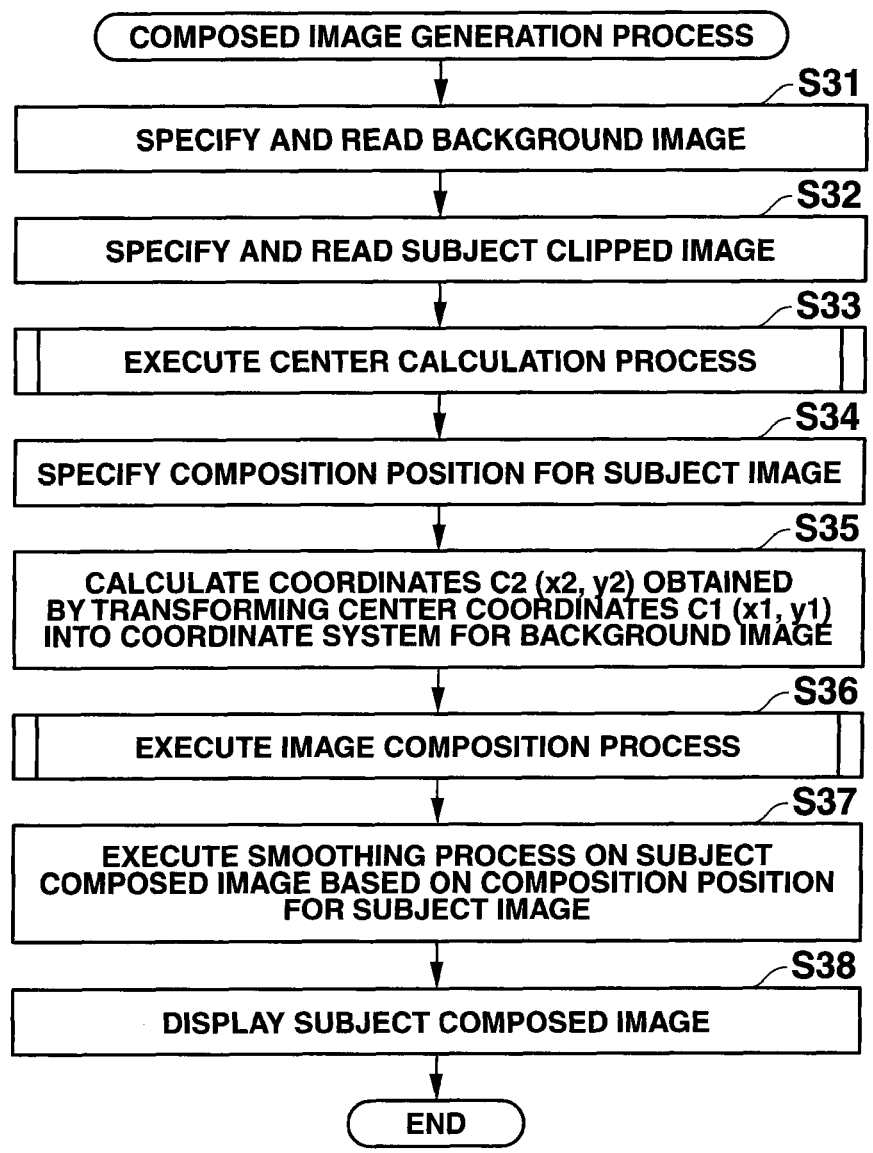
FIG. 7 is a flowchart showing an example of an operation related to the composed image generation process executed by the image pickup device in FIG. 1.
Figure 8:
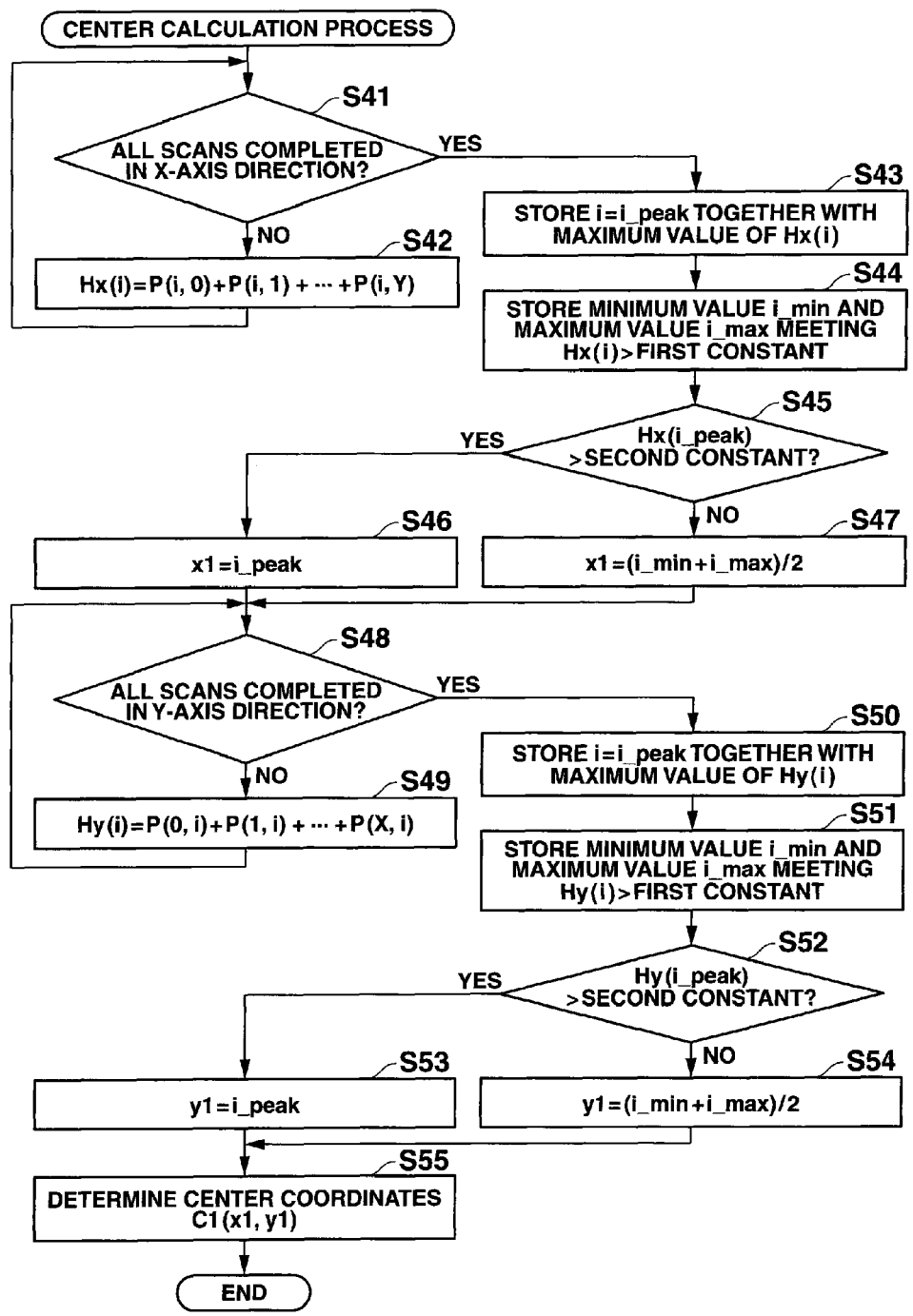
FIG. 8 is a flowchart showing an example of an operation related to a center calculation process in the composed image generation process.
Figure 9:
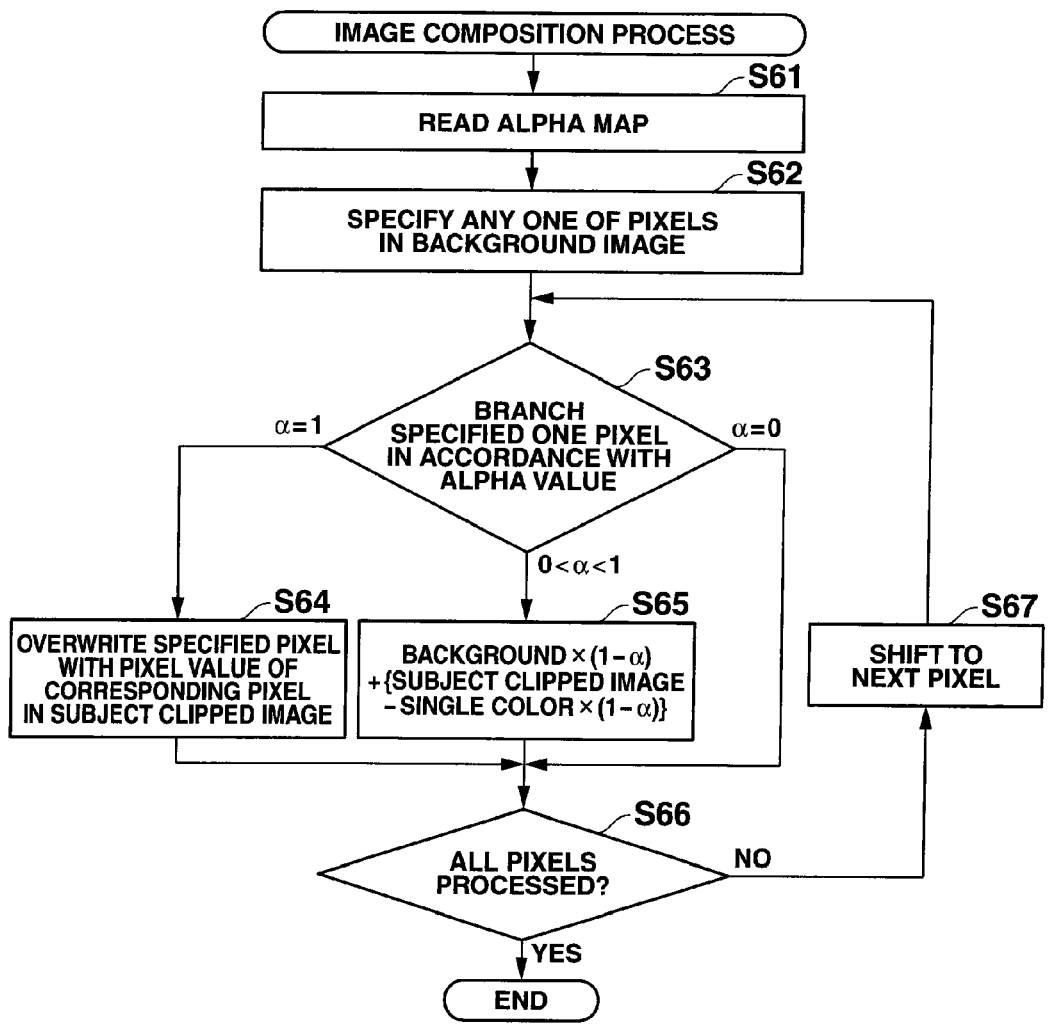
FIG. 9 is a flowchart showing an example of an operation related to an image generation process in the composed image generation process.

FIG. 7 is a flowchart showing an example of an operation related to the composed image generation process. Furthermore, FIG. 8 is a flowchart showing an example of an operation related to a center calculation process in the composed image generation process. Additionally, FIG. 9 is a flowchart showing an example of an operation related to an image composition process in the composed image generation process. In addition, FIG. 10A to FIG. 10C are diagrams showing an example of an image related to the composed image generation process.

The composed image generation process is executed when a still image taking mode included in the plurality of image taking modes displayed on the menu screen is selected and specified based on the user's predetermined operation of the selection determination button 12b on the operation input section 12.

As shown in FIG. 7, first, a desired background image P4a (FIG. 10A) included in the plurality of images recorded in the recording medium 9 is selected and specified based on the user's predetermined operation of the selection determination button 12b on the operation input section 12. Then, the central control section 13 allows the background obtaining section 8c of the image processing section 8 to read and expand the image data on the specified background image P4a into the image memory 5 (step S31).

Then, a desired subject clipped image P3 (FIG. 5C) included in the plurality of images recorded in the recording medium 9 is selected and specified based on the user's predetermined operation of the selection determination button 12b on the operation input section 12. Then, the central control section 13 allows the subject obtaining section 8b of the image processing section 8 to read and expand the image data on the specified subject clipped image P3 into the image memory 5 (step S32).

Subsequently, the central control section 13 allows the image composition section 8d of the image processing section 8 to execute a center calculation process of calculating the center coordinates of the subject image G in the subject clipped image P3 (step S33).

Now, the center calculation process will be described in detail with reference to FIG. 8.

As shown in FIG. 8, the image composition section 8d first receives the image data on the subject clipped image P3. The image composition section 8d then calculates the x-coordinate of the center coordinates C1 (x1, y1) of the subject image G. Specifically, the image composition section 8d determines whether or not all scans have been performed on the subject image G on the x-axis (step S41).

Here, upon determining that not all scans have been performed on the subject image G on the x-axis (NO in step S41), the image composition section 8d calculates the sum of histogram values for an unscanned x-axial position x=i (i=0 to x), i.e., Hx (i)=P (i, 0)+P (i, 1)+ . . . +P (i, y) (step S42). Then, the image composition section 8d shifts the processing to step S41.

The image composition section 8d sequentially scans the subject image G on the x-axis with, for example, i=0 to x set.

Then, in step S41, upon determining that all the scans have been performed on the x-axis (YES in step S41), the image composition section 8d determines the maximum value of the sum Hx (i) of the histogram values for all the scan positions. The image composition section 8d determines the x-axial position i with the maximum value to be "i=i_peak". The image composition section 8d then stores "i=i_peak" in the image memory 5 together with Hx (i_peak) (step S43).

Then, for all the scan positions involved in the sum Hx (i) of the histogram values, the image composition section 8d determines the maximum value Max and minimum value Min that meet "Hx (i)>first constant". The image composition section 8d then stores the corresponding positions "i=i_min" and "i=i_max" in the image memory 5 (step S44).

Subsequently, the image composition section 8d determines whether or not the maximum value Hx (i=peak) of the sum Hx (i) of the histogram values is greater than a second constant (step S45).

Here, upon determining that the maximum value Hx (i_peak) is greater than the second constant (YES in step S45), the image composition section 8d determines the position of the maximum value Hx (i_peak) to be the x-coordinate (x1=i_peak) of the center coordinates (step S46). On the other hand, upon determining that the maximum value Hx (i_peak) is not greater than the second constant (NO in step S45), the image composition section 8d determines a position corresponding to the center between the maximum value Max and minimum value Min of the histogram distribution to be the x-coordinate (x1=(i_min+i_max)/2) of the center coordinates (step S47).

Then, the image composition section 8d calculates the y-coordinate of the center coordinates C1 (x1, y1) of the subject image G. Specifically, the image composition section 8d determines whether or not all scans have been performed on the subject image G on the y-axis (step S48).

Here, upon determining that not all scans have been performed on the subject image G on the y-axis (NO in step S48), the image composition section 8d calculates the sum of histogram values for an unscanned y-axial position y=i (i=0 to y), i.e., Hy (i)=P (0, i)+P (1, i)+ . . . +P (x, i) (step S49). Then, the image composition section 8d shifts the processing to step S48.

The image composition section 8d sequentially scans the subject image G on the y-axis with, for example, i=0 to Y set.

Then, in step S48, upon determining that all the scans have been performed on the y-axis (YES in step S48), the image composition section 8d determines the maximum value of the sum Hy (i) of the histogram values for all the scan positions. The image composition section 8d determines the y-axial position i with the maximum value to be "i=i_peak". The image composition section 8d then stores "i=i_peak" in the image memory 5 together with Hy (i_peak) (step S50).

Then, for all the scan positions involved in the sum Hy (i) of the histogram values, the image composition section 8d determines the maximum value Max and minimum value Min that meet "Hy (i)>first constant". The image composition section 8d then stores the corresponding positions "i=i_min" and "i=i_max" in the image memory 5 (step S51).

Subsequently, the image composition section 8d determines whether or not the maximum value Hx (i=peak) of the sum Hy (i) of the histogram values is greater than a second constant (step S52).

Here, upon determining that the maximum value Hy (i_peak) is greater than the second constant (YES in step S52), the image composition section 8d determines the position of the maximum value Hx (i_peak) to be the y-coordinate (y1=i_peak) of the center coordinates (step S53). On the other hand, upon determining that the maximum value Hy (i_peak) is not greater than the second constant (NO in step S52), the image composition section 8d determines a position corresponding to the center between the maximum value Max and minimum value Min of the histogram distribution to be the y-coordinate (y1=(i_min+i_max)/2) of the center coordinates (step S54).

Then, the image composition section 8d determines the center coordinates C1 (x1, y1) of the subject image G based on the x-coordinate (x1) calculated in step S46 or S47 and the y-coordinate (y1) calculated in step S53 or S54.

As shown in FIG. 7, a composition position for the subject image G in the user's desired subject clipped image P3 is specified based on the user's predetermined operation of the selection determination button 12b on the operation input section 12 (step S34). Then, the image composition section 8d calculates the coordinates C2 (x2, y2) obtained by transforming the center coordinates C1 (x1, y1) of the subject image G into the coordinate system for the background image P4a (step S35).

Then, the central control section 13 allows the image composition section 8d to execute an image composition process of composing the background image P4a with the subject image G in the subject clipped image P3 based on the coordinates C2 (x2, y2) obtained by transforming the center coordinates C1 (x1, y1) of the subject image G into the coordinate system for the background image P4a (step S36).

The image composition process will described below in detail with reference to FIG. 9.

As shown in FIG. 9, the image composition section 8d first reads and expands the alpha map stored in association with the subject clipped image P3, into the image memory 5 (step S61).

For an area which may fall out of the range of the alpha map because the background image P4a deviates from the alpha map when the composition position and size of the subject clipped image P3 in the background image are determined, $\alpha=0$ is set to prevent an area in which an alpha value of 0 is not present from being created.

Then, the image composition section 8d specifies any one of the pixels (for example, a pixel in the upper left corner) in the background image P4a (step S62). The image composition section 8d branches the processing to this pixel based on the alpha value in the alpha map (step S63). Specifically, when any one of the pixels in the background image P4a has an alpha value of 1 (step S63; $\alpha=1$), the image composition section 8d overwrites the pixel with the pixel value of the corresponding pixel in the subject clipped image P3 (step S64). When the pixel has an alpha value of $0<\alpha<1$ (step S63; $0<\alpha<1$), the image composition section 8d uses a one's complement $(1-\alpha)$ to clip the subject image G to generate an image (background$\times(1-\alpha)$). The image composition section 8d then calculates a value blended with the single background color when the subject clipped image P3 is generated using the one's complement $(1-\alpha)$ in the alpha map. The image composition section 8d then subtracts the value from the subject clipped image P3 and composes the resultant subject clipped image P3 with the image (background image$\times(1-\alpha)$) obtained by clipping the subject image G (step S65). When the pixel has an alpha value of 0 (step S63; $\alpha=0$), the image composition section 8d section does nothing on the pixel and allows transmission through the background image P4a.

Subsequently, the image composition section 8d determines whether or not all the pixels in the background image P4a have been processed (step S66).

Upon determining that not all the pixels have been processed (NO in step S66), the image composition section 8d specifies the next pixel as a processing target and shifts the processing target to the pixel (step S67). The image composition section 8d thus shifts the processing to step S63.

The above-described processing is repeated until the image composition section 8d determines that all the pixels have been processed (YES in step S66). The image composition section 8d thus generates image data on the subject composed image P5 obtained by composing the subject clipped image P3 with the background image P4a.

Thus, the image composition process is finished.

As shown in FIG. 7, the smoothing processing section 8f of the image processing section 8 then executes a smoothing process on the subject composed image P5 based on the composition position for the subject image G in the subject clipped image P3 (step S37).

Specifically, the smoothing processing section 8f executes the smoothing process on the background image portion P4b of the subject composed image P5 with the process intensity of the smoothing process varied in accordance with the distance D from the coordinates C2 (x2, y2) obtained by transforming the center coordinates C1 (x1, y1) of the subject image G into the coordinate system for the background image P4a.

Thereafter, the display control section 10 allows the smoothed subject composed image P5 to be shown on the display screen of the display section 11 (step S38).

Specifically, the display section 11 shows, for example, the subject composed image P5 in which the pixels in the subject image G have a clear variation in grayscale, whereas the pixels in the background image portion P4b have a smooth variation in grayscale (FIG. 10C).

Thus, the composed image generation process is finished.

As described above, the image pickup device 100 according to the present embodiment composes the subject image G at the composition position for the subject image in the downward-taken background image P4a to generate a subject composed image P5. Then, based on the composition position in the subject image G, the image pickup device 100 executes the smoothing process on the subject composed image P5. Thus, a variation in grayscale among the pixels in the background image portion P4a of the subject composed image P5 can be made smoother with respect to the subject image G. Consequently, a sense of reality provided by the background image portion P4a can be suitably reduced based on the composition position for the subject image G.

That is, the smoothing process is executed as follows when the subject image G and background image P4a obtained by clipping the area containing the subject from the subject present image P1 are composed. That is, the smoothing process is not executed on the area in the subject composed image P5 which lies within the predetermined range substantially centered on the subject image G. The process intensity of the smoothing process is varied so as to increase consistently with the distance from a substantially central portion of the subject image G in the subject composed image P5. Thus, in the subject composed image P5 obtained, a variation in grayscale among the pixels in the subject image G are clarified, whereas a variation in grayscale among the pixels in the background image portion P4b is smoothed.

This prevents generation of a subject composed image P5 with a strong sense of discomfort in which the background image portion P4b related to the downward-taken background image P4a provides an excessively strong or weak sense of reality. Therefore, a highly expressive subject composed image P5, for example, a miniature image can be generated, and viewers take more interest in the image.

In particular, the smoothing process is executed such that the process intensity of the smoothing process is varied so as to increase in a direction substantially parallel to at least one of the x- and y-axes, consistently with the distance from a substantially central portion of the subject image G in the subject composed image P5. Thus, the smoothing process can be executed on the background image portion P4b of the subject composed image P5 in a predetermined direction. Therefore, the subject composed image P5 can be made more expressive, and viewers take more interest in the image.

The present invention is not limited to the above-described embodiment. Various improvements may be made to the above-described embodiment and the design may be changed without departing from the spirit of the present invention.

For example, in the above-described embodiment, the background image portion P4b of the subject composed image P5 is subjected to the smoothing process. However, the processing target of the smoothing process is not limited to this aspect but may be the background image P4a not composed with the subject image G yet.

That is, the following configuration is possible. The background image P4a is subjected to the smoothing process based on the composition position for the subject image G in the background image P4a specified by the central control section 13 based on the user's predetermined operation of the operation input section 12. Then, the smoothed background image P4a and the subject image G are composed to generate a subject composed image P5. Such a configuration can make a variation in grayscale among the pixels in the background image portion P4b of the subject composed image P5 smoother with respect to the subject image G. Consequently, a sense of reality provided by the background image portion P4b can be suitably reduced. Therefore, the subject composed image P5 can be made more expressive, and viewers take more interest in the image.

Furthermore, even in such a configuration, the smoothing process may be executed as follows. That is, the smoothing process is not executed on the area in the subject composed image P5 which lies within the predetermined range substantially centered on the subject image G. Alternatively, the process intensity of the smoothing process may be varied so as to increase consistently with the distance from a substantially central portion of the subject image G in the subject composed image P5. Additionally, the smoothing process may be executed such that the process intensity of the smoothing process is varied so as to increase in a direction substantially parallel to at least one of the x- and y-axes, consistently with the distance from a substantially central portion of the subject image G in the subject composed image P5.

Moreover, in the above-described embodiment, the smoothing process is executed in the direction substantially parallel to at least one of the x- and y-axes. However, this is not the only direction of the smoothing process. Any one predetermined direction and an orthogonal direction substantially orthogonal to the one direction may be used. For example, in a composition obliquely inclined such that at least one diagonal line in the background image P4a is substantially parallel to the vertical axis or the horizontal axis, the smoothing process may be executed in a direction substantially parallel to at least one of the extending direction of the one diagonal line and an orthogonal direction substantially orthogonal to the extending direction.

Furthermore, in the above-described embodiment, the smoothing process is illustrated as predetermined image processing. However, the present invention is not limited to this aspect. For example, in addition to the smoothing process, a process for adjusting the contrast or brightness of the background image portion P4b or the subject image G may be executed. That is, when the contrast or brightness of the subject image G is increased with respect to the background image portion P4b, a sense of reality provided by the background image portion P4b can be reduced with respect to the subject image G. This makes the subject composed image P5 more interesting.

Additionally, in the above-described embodiment, the technique using the averaging filter is illustrated as the smoothing process. However, the present invention is not limited to this aspect. Any method for smoothing images, for example, a method using an Iris filter, may be used.

In addition, in the above-described embodiment, the center coordinates C1 (x1, y1) of a substantial center of the subject image G is calculated based on the histogram of the subject image G. However, a technique may be used which uses the maximum and minimum values for the horizontal (x-) axis of the subject image G and the maximum and minimum values for the vertical (y-) axis of the subject image G.

Furthermore, in the composed image generation process according to the present embodiment, first, the subject image G is obtained, and the background image P4a is then obtained. However, this order is only illustrative, and the present invention is not limited to the order. The present configuration may be optionally varied so as to reverse the order.

Moreover, the configuration of the image pickup device 100 illustrated in the above-described embodiment is only illustrative, and the present invention is not limited to the configuration. That is, for example, an image composition device may be provided which is configured to allow an image pickup device different from the image pickup device 100 to obtain the background image P4a and the subject clipped image P3 and to record image data transferred by the image pickup device and execute only a composed image generation process on the image data.

In addition, in the above-described embodiment, the central control section 13 and the image processing section 8 drive and implement the functions of the foreground obtaining means, the background obtaining means, the specification means, the composition means, and the image processing means. However, the present invention is not limited to this configuration. The functions may be implemented by the central control section 13 by executing predetermined programs and the like.

That is, programs are stored in a program memory (not shown in the drawings) configured to store the programs; the programs include a foreground obtaining process routine, a background obtaining process routine, a specification process routine, a composition process routine, and an image processing routine. The foreground obtaining process routine may allow CPU in the central control section 13 to function as foreground obtaining means for obtaining a foreground image to be composed with the background image P4a. Furthermore, the background obtaining process routine allows CPU in the central control section 13 to function as background obtaining means for obtaining the background image P4a taken downward compared to the foreground image. Additionally, the specification process routine may allow CPU in the central control section 13 to function as specification means for specifying a composition position for the foreground image in the background image P4a obtained by the background obtaining means. In addition, the composition processing routine may allow CPU in the central control section 13 to function as composition means for composing the foreground image at the composition position specified by the specification means to generate a composed image. Furthermore, the background obtaining processing routine may allow CPU in the central control section to function as image processing means for executing a smoothing process on the composed image based on the composition position specified by the specification means.

Moreover, in addition to ROM, hard disk, and the like, a nonvolatile memory such as a flash memory and a portable recording medium such as CD-ROM can also be used as a computer readable medium in which the programs for executing the above-described processes are stored. Additionally, a carrier wave may be applied as a medium for providing program data via a communication line.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image composition device comprising:
   an obtaining section configured to obtain a downward-taken background image and a foreground image to be composed with the downward-taken background image;
   a specification section configured to specify a composition position at which the foreground image is composed, in the background image obtained by the obtaining section;
   a composition section configured to compose the foreground image at the composition position in the background image which is specified by the specification section, to generate a composed image; and
   an image processing section configured to execute a smoothing process on only the background image of the composed image with a process intensity controlled based on the composition position.

2. The image composition device according to claim 1, further comprising an area specification section configured to specify a predetermined range substantially centered on the foreground image in the composed image, wherein the image processing section avoids executing the smoothing process on an area within the predetermined range substantially centered on the foreground image specified by the area specification section.

3. The image composition device according to claim 1, wherein the image processing section executes the smoothing process such that the process intensity of the smoothing process is varied so as to increase consistently with a distance from the foreground image in the composed image.

4. The image composition device according to claim 3, wherein the image processing section executes the smoothing process such that the process intensity of the smoothing process is varied so as to increase in a direction substantially parallel to a predetermined one direction and an orthogonal direction substantially orthogonal to the one direction, consistently with the distance from the foreground image in the composed image.

5. The image composition device according to claim 3, wherein the distance is from a substantially central portion of the foreground image.

6. The image composition device according to claim 1, wherein the foreground image is a subject image obtained by clipping an area containing a subject from an image in which a background and the subject are present.

7. An image composition method for an image composition device configured to compose a plurality of images, the method comprising:
   obtaining a downward-taken background image and a foreground image to be composed with the background image;
   specifying a composition position at which the foreground image is composed, in the obtained background image;
   composing the foreground image at the composition position in the background image to generate a composed image; and
   executing a smoothing process on only the background image of the composed image with a process intensity controlled based on the composition position.

8. A non-transitory computer-readable storage medium having stored thereon a program that is executable by an image composition device configured to compose a plurality of images, the program being executable by the image composition device to perform functions comprising:
   obtaining a downward-taken background image and a foreground image to be composed with the background image;
   specifying a composition position at which the foreground image is composed, in the obtained background image;
   composing the foreground image at the composition position in the background image to generate a composed image; and
   executing a smoothing process on only the background image of the composed image with a process intensity controlled based on the composition position.

* * * * *